United States Patent [19]

Hara et al.

[11] Patent Number: 5,064,919
[45] Date of Patent: Nov. 12, 1991

[54] METATHESIS POLYMERIZATION OF CYCLOOLEFINS

[75] Inventors: Shigeyoshi Hara; Zen-ichiro Endo; Hiroshi Mera, all of Iwakuni, Japan

[73] Assignee: Hercules Incorporated, Wilmington, Del.

[21] Appl. No.: 442,428

[22] Filed: Nov. 24, 1989

Related U.S. Application Data

[63] Continuation of Ser. No. 303,074, Jan. 30, 1989, abandoned, which is a continuation of Ser. No. 103,473, Oct. 1, 1987, abandoned.

[30] Foreign Application Priority Data

Oct. 1, 1986 [JP] Japan ............................. 61-231124

[51] Int. Cl.$^5$ .................. C08F 4/69; C08F 220/52
[52] U.S. Cl. .................................... 526/169; 526/142; 526/262
[58] Field of Search .................. 526/259, 262, 169

[56] References Cited

U.S. PATENT DOCUMENTS

| | | | |
|---|---|---|---|
| 3,959,234 | 5/1976 | Kurosawa et al. | 526/259 |
| 4,080,491 | 3/1978 | Kobayashi et al. | 526/281 |
| 4,176,220 | 11/1979 | Ikeda et al. | 526/281 |
| 4,380,617 | 4/1983 | Minchak et al. | 526/161 |
| 4,400,340 | 8/1983 | Klosiewicz . | |
| 4,418,179 | 11/1983 | DeWitt | 525/97 |
| 4,426,502 | 1/1984 | Minchak | 526/281 |
| 4,426,506 | 1/1984 | Branco | 526/302 |
| 4,436,858 | 3/1984 | Klosiewicz | 524/296 |
| 4,458,037 | 7/1984 | Leach | 521/124 |
| 4,469,809 | 9/1984 | Klosiewicz | 502/117 |
| 4,481,344 | 11/1984 | Newburg | 526/283 |
| 4,485,208 | 11/1984 | Klosiewicz | 524/296 |
| 4,496,668 | 1/1985 | Newburg | 521/91 |
| 4,496,669 | 1/1985 | Leach | 521/93 |
| 4,507,453 | 3/1985 | Tom | 526/283 |
| 4,520,181 | 5/1985 | Klosiewicz | 525/247 |
| 4,535,097 | 8/1985 | Newburg | 521/139 |
| 4,598,102 | 7/1986 | Leach | 521/93 |
| 4,604,408 | 8/1986 | Newburg | 521/91 |
| 4,604,447 | 8/1986 | Malpass | 526/189 |
| 4,607,077 | 8/1986 | Silver et al. | 524/708 |
| 4,657,881 | 4/1987 | Crampton et al. | 502/80 |
| 4,661,575 | 4/1987 | Tom | 526/283 |

FOREIGN PATENT DOCUMENTS

| | | |
|---|---|---|
| 2452461 | 5/1975 | Fed. Rep. of Germany . |
| 53-17700 | 2/1978 | Japan . |
| 24400 | 3/1978 | Japan . |
| 293208 | 12/1986 | Japan . |

OTHER PUBLICATIONS

Patent Abstracts of Japan, vol. 2, No. 59, Apr. 27, 1978, p. 448 (C-78), Abstract of JP-A-5317700.
Japanese Patent L-O-P No. 17700/1978 and English Translation and European Search Report.

*Primary Examiner*—Edward J. Smith
*Attorney, Agent, or Firm*—William S. Alexander; Marion C. Staves; Roy V. Jackson

[57] ABSTRACT

A process for producing a molded article by introducing a reactive liquid mixture which comprises a cycloalkene containing dicyclopentadiene, a norbornene-type monomer containing at least one N-substituted 5-membered cyclic imide group and a metathesis polymerization catalyst system and which has moderated metathesis polymerizability into a mold in which the liquid mixture is metathesis polymerized, and a multi-part polymerizable composition for producing the molded article.

8 Claims, 1 Drawing Sheet

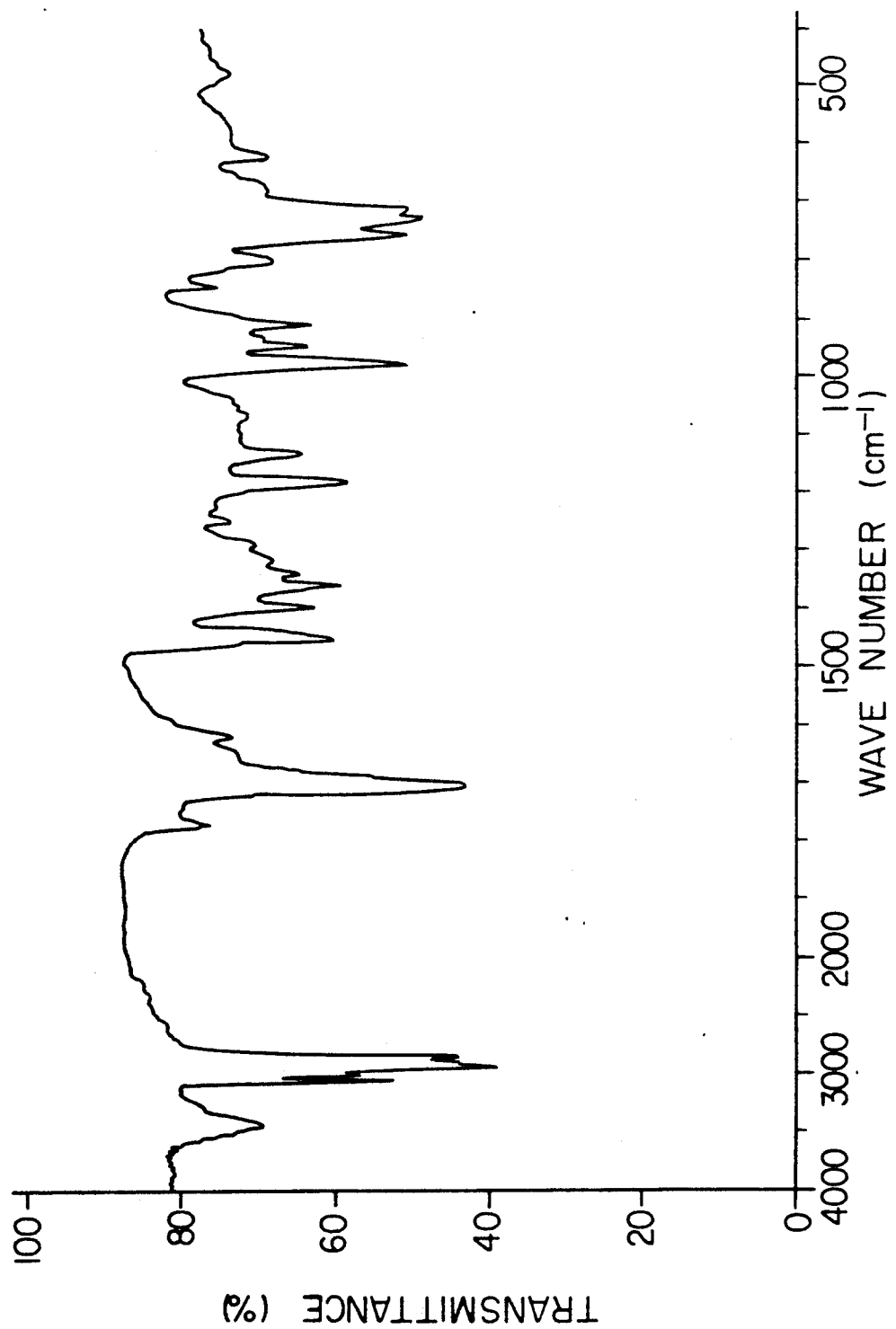

METATHESIS POLYMERIZATION OF CYCLOOLEFINS

This is a continuation of application Ser. No. 07/303,074, filed Jan. 30, 1989, which is a continuation of application Ser. No. 07/103,473, filed Oct. 1, 1987, both now abandoned.

FIELD OF THE INVENTION

This invention relates to a process for producing a molded article by metathesis polymerization of cycloolefins, a molded article and a cross-linked polymer produced by the process and a polymerizable composition for producing the molded article and the polymer.

BACKGROUND OF THE INVENTION

It is disclosed in Japanese Patent Laid Open Sho 53-24400, U.S. Pat. No. 4,400,340 and U.S. Pat. No. 4,426,502 that ring-opening polymerization of a cycloolefin containing norbornene moiety, e.g. dicyclopentadiene (called "DCP" hereinafter), in the presence of a metathesis polymerization catalyst system produces a cross-linked polymer containing olefinic groups in the main chain.

Said Japanese Patent Laid Open Sho 53-24400 discloses polymerization of DCP with or without other cycloolefin or norbornene type monomer in the presence of a metathesis polymerization catalyst system, and there is disclosed therein the use of a variety of norbornene type monomers including the monomer

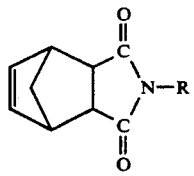

wherein R is a substituent such as alkyl and aryl groups. However, this Japanese Patent Laid Open Sho 53-24400 is characterized by per se a new metathesis catalyst system, and polymerization of DCP, etc. is accomplished with a hydrocarbon solvent. DCP polymer prepared therein is recovered from the solvent and then is used to produce a molded article. This means that DCP polymer prepared by using the catalyst is substantially no-crosslinked thermoplastics.

Said U.S. Pat. No. 4,400,340 and U.S. Pat. No. 4,426,502 disclose the production of a molded article by injecting a reactive liquid mixture comprising norbornene-type monomer such as DCP and a metathesis polymerization catalyst system into a mold in which said liquid mixture is metathesis polymerized in bulk (called "RIM process" hereinafter). RIM process is a low pressure one-step or one-shot injection of a liquid mixture into a closed mold where rapid polymerization occurs resulting in a molded article. Thus, there are easily produced large-sized molded articles by RIM process from DCP and the like. The molded articles have been taken notice from the industrial point of view since they have attractive physical properties as balanced in stiffness and impact resistance.

The metathesis polymerization catalyst system used in RIM process comprises a catalyst component comprising a compound of a transition metal such as tungsten, molybdenum, rhenium or tantalum and an activator component comprising an organic metal compound of aluminum, tin or the like. The metathesis polymerization catalyst system initiates the polymerization reaction upon mixing of the catalyst component and the activator component. RIM process utilizes advantageously characteristics of the metathesis polymerization catalyst system, and therein there is produced a molded article by mixing the first reactive solution containing the catalyst component and a monomer such as DCP and the second reactive solution containing the activator component and the monomer and then immediately injecting the mixture into a mold.

However, both of the catalyst component and the activator component of said catalyst system are too active for polymerizing a cycloolefin such as DCP in bulk even at room temperature, and thus the polymerization of DCP and the like often occurs before poured into a mold and it makes the pouring of the mixture into the mold difficult.

Therefore, it is desirable to moderate the metathesis polymerization reaction as to provide an adequate induction period.

Said U.S. Pat. No. 4,400,340 discloses using Lewis-bases to moderate the polymerization reaction of RIM process. However, Lewis-bases remaining in the polymer injure molded polymer articles and often produce undesired volatile compounds.

Said U.S. Pat. No. 4,426,502 is characterized by the use of a particular metathesis polymerization catalyst system to moderate the polymerization reaction of RIM process. However, this requires the inconvenient limited selection of the metathesis polymerization catalyst system.

Recently, there has been produced a molded article by so-called "pre-mix process" which comprises mixing a metathesis polymerization catalyst system and a monomer such as DCP to prepare a pre-mixture and then introducing the pre-mixture into a mold.

A molded article can be produced more easily by pre-mix process than by RIM process, since pre-mix process requires simpler molding devices than in RIM process. However, pre-mix process also often necessitates the more effective moderation of the metathesis polymerization reaction than RIM process.

Now, we have found that norbornene-type monomers containing at least one Lewis-base group in the structure can moderate the metathesis polymerization reaction in bulk of DCP and at the same time can act as a metathesis polymerizable comonomer resulting in a copolymer in which a low molecular weight Lewis base does not substantially remain. Thus, it is very advantageous to use in RIM process and pre-mix process such monomers containing Lewis-base group.

Further, we have found that a norbornene-type monomer containing at least one N-substituted 5-membered cyclic imide group (called "ICN" hereinafter) is more useful among said norbornene-type monomers containing Lewis-base group, since such imide group can effectively moderate the metathesis polymerization reaction and the introduction of the imide group provides the polymer with improved mechanical and chemical properties.

Therefore, it is an object of the present invention to provide a process for producing a molded article by the metathesis polymerization of DCP with ICN to moderate the metathesis polymerization reaction. A further object is to provide a multi-part polymerizable composition used for producing the molded article. Another object is to provide a molded article and a crosslinked polymer produced by the process.

SUMMARY OF THE INVENTION

The present invention relates to a process for producing a molded article by introducing a reactive liquid mixture which comprises a metathesis polymerizable monomer and a metathesis polymerization catalyst system into a mold in which said liquid mixture is metathesis polymerized in bulk to produce the molded article, said metathesis polymerizable monomer comprising (a) 99.9–70 mol % of a metathesis polymerizable cycloalkene containing at least 30 mol % of dicyclopentadiene (DCP) and (b) 0.1–30 mol % of a norbornene-type monomer containing at least one N-substituted 5-membered cyclic imide group (ICN) in the structure, said mole % of the norbornene-type monomer being calculated by multiplying mol % of ICN actually used by the number of the imide group in the norbornene-type monomer.

Further, the present invention relates to a multi-part polymerizable composition which comprises metathesis-polymerizable monomer comprising (a) 99.9–70 mol % of a metathesis polymerizable cycloalkene containing at least 30 mol % of DCP and (b) 0.1–30 mol % of an ICN; and a metathesis polymerization catalyst system comprising a catalyst, said mol % of the norbornene-type monomer being calculated by multiplying mol % of ICN actually used by the number of the imide group contained in the norbornene-type monomer, and said catalyst and activator being not present in the same part.

In addition, the present invention provides a molded article and a crosslinked polymer produced by the above process.

BRIEF DESCRIPTION OF THE DRAWING

The single figure is the infrared absorption spectrum of the polymer of Example 2.

DETAILED DESCRIPTION OF THE INVENTION

In the present invention, the metathesis polymerizable cycloalkene (a) should contain at least 30 mol % of DCP, and preferably at least 50 mol % of DCP.

It is preferred that DCP used in the invention is of a high purity of 95% or higher, and more preferably of 97% or higher. Whereas the impurities should, of course, be those which do not inhibit activity of the metathesis catalyst system, they should preferably be metathesis polymerizable. It is preferable that the content of polar compounds which inhibit metathesis polymerization, e.g. as alcohols, carboxylic acids and carbonyl compounds, is as low as possible.

In the present invention, at least one other methathesis polymerizable cycloalkene may be used for copolymerization in the amount of up to 70 mol % of (a) with DCP.

From the aspect of metathesis polymerizability, cycloalkenes except cyclohexene, such as cyclobutene, cyclopentene, cycloheptene, cyclooctene and substituted derivatives thereof, may be used. Compounds containing in the molecule at least one norbornene structure of the formula

wherein valencies represented by a dotted line may be bonded mutually via another atom to form a further cyclic structure or may be a double bond, are preferred, since they have the similar metathesis polymerizability to DCP.

Those cycloalkenes other than DCP can be grouped into those consisting of hydrocarbon (A) and those containing at least one hetero-atom in the structure (B).

The aforesaid (A) are preferably cycloalkenes having carbon atoms of 7–20 and up to two metathesis polymerizable groups, which may include norbornene, 5-methylnorbornene, 5-ethylnorbornene, 5-butylnorbornene, 5-vinylnorbornene, 5-ethylidenenorbornene, 5-isopropenylnorbornene, 5-isopropyridenenorbornene, cyclopentadiene-methylcyclopentadiene-codimer, 5-phenylnorbornene, 1,4,5,8-dimethano-1,4,4a,5,8, 8a-hexahydronaphthalene, 6-ethylidene-1,4,5,8-dimethano-1,4,4a,5,7,8,8a-heptahydronaphthalene, tri-cyclo-[8,2,1,0]trideca-5,11-diene, 1,4,5, 8-dimethano-1,4,4a,5,6,7,8,8a-octahydronaphthalene, 6-methyl-1,4,5,8-dimethano-1,4,4a,5,6,7,8, 8a-octahydronaphthalene, tricyclopentadiene and the like.

The aforesaid (B) are those having at least one hetero atom such as oxygen, nitrogen and the like together with metathesis polymerizable cycloalkene radical. The hetero atom of said (B) forms a polar group in the structure of said (B), and thus said (B) can moderate the metathesis polymerization reaction as well as said ICN. Said (B) often can increase compatibility of ICN with cycloalkene based on the polar group of said (B).

Examples of the polar groups having the above mentioned characteristics may include cyano group, carboxylic ester groups, ether groups and/or tertiary amino groups.

Examples of said (B) are norbornenes having carbon atoms of 8–25 and at least one said polar group, which include 5-cyanonorbornene, 5,6-dicyanonorbornene, 6-cyano-1,4,5,8-dimethano-1,4,4a,5,6,7,8,8a -octahydronaphthalene, 5-methoxycarbonylnorbornene, 5-methyl-5-methoxycarbonylnorbornene, 5-butoxynorbornene, 5-phenoxymethylnorbornene, 5-acetyloxynorbornene, 5-methyl-5-butoxycarbonylnorbornene, nadic acid dimethylester, 5-(4-pyridyl)-norbornene and the like.

ICN is preferably a compound containing at least one structure unit selected from the following formulas;

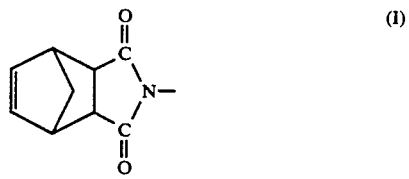

(I)

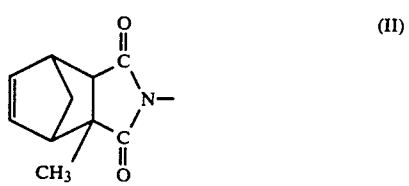

(II)

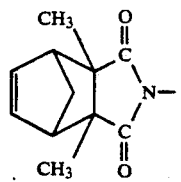

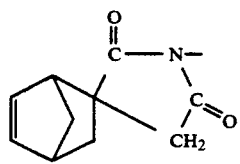

and

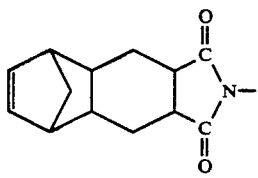

wherein nitrogen atom forming the 5-membered cyclic imide radical is attached to a mono-, di- or tri-valent hydrocarbyl substituent having up to 18 carbon atoms, preferably up to 12 carbon atoms. Said hydrocarbyl substituent may contain oxygen in the form of ether and the like.

Examples of mono-valent hydrocarbyl substituent include methyl, ethyl, propyl, butyl, amyl, hexyl, octyl, nonyl, decyl, stearyl, phenyl, toluyl, xylyl, isopropyl-phenyl, butylphenyl, nonylphenyl and the like. Among of them, alkyls having carbon atoms of 3-9 are preferable, since they provide easily polymerizable melting point for said norbornene-type monomer.

In addition, alkyls, preferably, lightly branched alkyls having carbon atoms of 3-17 can act as internal plasticizing groups, which can improve flexibility of the crosslinked polymers.

Examples of di-valent hydrocarbyl substituent include ethylene, butylene, hexamethylene, 2,2,4- or 2,4,4-trimethylhexamethylene, ethylenglycohol-dipropyleneether, nonylene, dodecamethylene and the like.

When said hydrocarbyl substituent is di- or tri-valent, ICN has two or three N-substituted 5-membered cyclic imide group.

As mentioned above, ICN can moderate the metathesis polymerization of DCP. Besides it, ICN provides the polymer with polarity and increased heat resistance. Heat resistance is more increased when said hydrocarbyl substitute attached to nitrogen atom has few carbon atoms or ring structure, or when ICN has two or three N-substituted 5-membered cyclic imide groups, although such ICN can be copolymerized with cycloalkene such as DCP in only small amount owing to the high melting-point of ICN and poor compatibility of ICN with cycloalkenes.

When the hydrocarbyl substituent attached to nitrogen atom is an alkyl group or an alkylene group having many carbon atoms, it internally plasticizes the polymer prepared and thus increases the impact strength of it as mentioned before. However, too many carbon atoms of the alkyl group or alkylene group result in the lowering of the soften point of the polymer. Alkyl groups having carbon atoms of 3-9 and alkylene groups having carbon atoms of 6-12 are preferable from viewpoint of heat-resistance and impact strength balance.

ICN is preferably prepared by reacting DCP with an unsaturated dicarboxylic acid anhydride such as maleic acid anhydride, citraconic acid anhydride, dimethyl maleic acid anhydride, itaconic acid anhydride and the like under Diels Alder addition reaction and then reacting the Diels Alder adduct prepared with a primary amine. ICN may be also prepared by Diels Alder reaction of DCP with an unsaturated dicarboxylic acid imide such as maleimide, citraconimide, dimethylmaleimide, itaconicimide and the like.

Among two above processes, the former process is more preferable, since, in the latter process, there often occur side-reactions such as Michael addition reaction, i.e. the addition reaction of a primary amine to the unsaturated bond of an unsaturated dicarboxylic acid and thus it is difficult to prepare a highly pure unsaturated dicarboxylic acid imide. Among the structure units (I)–(V) set forth above is economically preferred nadic acid imide unit of the formula (II).

ICN used in the invention should have a high purity. There should be removed from ICN impurities inhibiting activity of the metathesis catalyst system. Examples of impurities are primary amines, secondary amides, carboxyl-containing compounds and the like.

As mentioned above, in the invention, there are and 0.1-30 mol % of ICN. However, it is preferred to use 0.1-10 mol %, more preferably 0.5-5 mole %, of ICN in RIM process, since in RIM process, the liquid mixture is injected into the mold shortly after impingement-mixing of reactive solutions and thus there may be used a small amount of ICN.

In pre-mix process including resin transfer molding process or resin injection process, it is preferred to use 10-30 mol % of ICN to obtain a processable pre-mixture.

The degree of the moderation by ICN depends on the type of the substituent attached to nitrogen atom of ICN. An aliphatic-substituent moderates more strongly than an aromatic-substituent. The degree of the moderation by ICN also depends on the number of imide groups in ICN. 0.1-30 Mol % of ICN set forth above is calculated by multiplying mol % of ICN actually used by the number of the imide group contained in ICN. Thus, when ICN contains two imide groups, the mol % of ICN set forth above is equivalent to two times of mol % of ICN actually used.

In the invention, said reactive mixture to be introduced into a mold is prepared by mixing at least two of the first reactive solution containing the catalyst of the metathesis polymerization catalyst system and the monomers and the second reactive solution containing the activator of the metathesis polymerization catalyst system and the monomers.

Both of the first and second reactive solutions may contain both of the metathesis polymerizable cycloalkene and ICN as said monomers. Further, the monomer composition of the first reactive solution may differ from it of the second reactive solution.

For example, the first reactive solution may contain the metathesis polymerizable cycloalkenes and ICN and the second reactive solution may contain only the metathesis polymerizable cycloalkenes. However, the total monomer ratio, i.e. the molar ratio of cycloalkene to ICN, should be in the range set forth above.

As the catalyst component of the metathesis polymerization catalyst system are used salts such as halides of tungsten, molybdenum, rhenium or tantalium, preferably, tungsten and molybdenum. Particularly preferable are the tungsten compounds. Among tungsten compounds are preferred tungsten halides, tungsten oxyhalides and the like. More particularly, tungsten hexachloride, tungsten oxychloride and the like are preferred. However, such tungsten compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound, and then a chelating agent or a Lewis base is added to the tungsten compound solution in order to prevent undesirable polymerization prior to mixing with cycloalkene monomers.

Those additives may include acetylacetone, acetoacetic acid alkyl esters, tetrahydrofuran, benzonitrile and the like. About 1-5 mols of a chelating agent or the Lewis base is preferably used per one mol of the tungsten compound. Thus, the first reactive solution containing the monomers and the tungsten or other metathesis catalyst component is kept stable sufficiently for practical use.

The activator components of the metathesis polymerization catalyst system include organic metal compounds such as alkylated products of metals of Group I-Group III in the Periodic Table, preferably, tetraalkyl tins, alkylaluminum compounds and alkylaluminum halide compounds including diethylaluminum chloride, ethylaluminum dichloride, trioctylaluminum, dioctylaluminum iodide, tetrabutyltin and the like. The activator component is dissolved in a mixture of monomers to form the other reactive solution.

According to the present invention, in principle, the molded articles are produced by mixing the first reactive solution and the second reactive solution as described above. The polymerization reaction, however, starts so rapidly when above-mentioned composition is used and so the undesirable initiation of polymerization often accompanied by partial gelling occurs before completion of filling the mixed solution into the mold. In order to overcome the problem it is preferable to use an polymerization moderating agent.

As such moderators are used Lewis bases in general, particularly, ethers, esters, nitriles and the like.

Examples of the moderators include ethylbenzoate, butyl ether, diglyme, diethyleneglycoldibutylether, benzonitrile and the like. Such moderators are most effective when mixed with the activator component without cycloalkene monomers, forming some kind of complexes with the activator component. They are also effective when added to the second solution and/or the first solution. There can also act as a moderator Lewis bases which are used as a masking agent for the metathesis main catalyst component to prevent the undesirable cationic polymerization of cycloalkenes.

However, unpolymerizable Lewis bases often cannot be used in an enough amount to moderate the polymerization reaction, since they remain being unpolymerized in the polymer and damage the polymer, e.g. decrease heat-resistance of the polymer.

ICN used in the invention is itself a Lewis base and thus it can act as a moderator as well as a masking agent. Therefore, ICN is a very effective polymerizable moderator, and can be added in a desired amount without damaging the resultant polymer. Cycloalkenes, containing a Lewis-base group other than cyclic imide group of ICN such as ether, ester, cyano, and tert amine group, also can act as a polymerizable moderator although not so effective as ICN.

Practically, ICN is often used with a certain amount of unpolymerizable moderator and/or masking agent such as diglyme and acetylacetone which are effective and stable in contact with the activator component and the main catalyst component of the metathesis catalyst system before mixed with the monomers.

When a tungsten compound is used as the catalyst component, the ratio of the tungsten compound to the above-mentioned monomers is about 1000:1-about 15000:1, and preferably about 2000:1 on molar base. When an alkylaluminum compound is used as the activator component, ratio of the aluminum compound to the above-mentioned monomers is about 100:1-about 2000:1 and preferably around a ratio of about 200:1-- about 500:1 on molar base. The amount of the masking agent or the moderator may be adjusted by experiments depending upon the amount of the catalyst system.

A variety of additives may be used practically in the present invention to improve or to maintain characteristics of the molded articles. The additives include fillers, reinforcing agents, pigments, antioxidants, light stabilizers, macromolecular modifiers and the like. These additives must be added to the starting solutions, since they cannot be added after the solutions are polymerized to the solid molded polymer.

They may be added to either one or both of multi-part reactive solutions. The additives must be ones being substantially unreactive with the highly reactive catalyst or activator component in the solution to avoid troubles as well as not to inhibit polymerization.

If a reaction between the additive and the catalyst is unavoidable but does not proceed so rapidly, the additive can be mixed with the monomers to prepare a third solution, and it is mixed with the first and/or second solutions just before pouring the mixture into a mold. When the additive is a solid filler, a reactive solution in which the filler is suspended can be used. Instead, the mold can be filled with the filler prior to the pouring of the reactive solutions into the mold.

The reinforcing agents and fillers can improve flexural modulus of the polymer. They include glass fibers, mica, carbon black, wollastonite and the like. The fillers whose surfaces are treated with silan coupling agent may preferably be employed.

The molded articles of the invention may preferably contain an antioxidant. Preferably, a phenol- or amine-antioxidant is added previously to the polymerizable solution. Examples of the antioxidants include 2,6-t-butyl-p-cresol, N,N'-diphenyl-p-phenylenediamine, tetrakis[methylene(3,5-di-t-butyl-4-hydroxycinnamate)]methane, methylene-4,4'-bis(3,5-di-t-butylphenol) and the like.

The polymer molded article of the invention may also contain other polymers, which are added to the monomer solution. Among polymers, elastomers are more preferable, since they increase the impact strength of the molded articles and are effective in controlling the viscosity of the solution. Examples of the elastomers include styrene-butadiene rubber, polybutadiene, butadiene-styrene triblock rubber, polyisoprene, butyl rubber, ethylene-propylene rubber, ethylene-propylene-diene terpolymers and the like.

As described above, the polymer molded articles of the invention are preferably prepared by simultaneous molding with polymerizing, i.e. by RIM process or pre-mix process including RTM and RI process. In RIM process, two-part monomer solutions containing the catalyst and the activator respectively are rapidly mixed in the mixing head of a RIM instrument and the mixture is poured into a mold wherein it polymerizes and is molded.

In pre-mix process, two-part monomer solutions containing the catalyst component and the activator component respectively are previously mixed to prepare a pre-mixture and then the pre-mixture is introduced into a mold. In the pre-mix process, fillers such as glass fibers may be placed in the mold prior to pouring the pre-mixture, or may be added in the pre-mixture.

In both of RIM process and pre-mix process, the mixture can be introduced into the mold under relatively low pressure so that an inexpensive mold is usable. The temperature inside the mold increases rapidly by heat of the polymerization reaction so that the polymerization reaction is completed in a short time. The molded article of the invention can be removed easily from the mold without a releasing agent unlike the polyurethane-RIM process.

The surface of the molded articles of the invention has polarity by the imide radical based on ICN and probably by the oxidized layer formed on the surface so that conventional coatings such as epoxy, polyurethane and the like adhere to the surface well.

The present invention provides a variety of molded articles which include large sized molded articles such as parts of various vehicles including automobiles, motorbikes, motorboats, snowmobiles, etc. and housings of electric and electronic instruments and the like.

The invention described herein is illustrated by the following examples. These examples do not limit the invention.

EXAMPLES 1–3 AND COMPARATIVE EXAMPLE 1

Commercially available dicyclopentadiene (DCP) was purified by distillation under nitrogen and reduced pressure to produce purified DCP with a freezing point of 33.4° C. The purity was determined by gas chromatography to be not less than 99%. Commercially available nadic acid anhydride was reacted with butyl amine to prepare N-butyl nadic imide (called "BNI" hereinafter). BNI was purified by distillation to a purity of not less than 99% as measured by gas chromatography.

PREPARATION OF SOLUTIONS CONTAINING THE CATALYST 20 g of tungsten hexachloride was added to 70 ml of anhydrous toluene under nitrogen and then a solution consisting of 21 g of nonylphenol and 16 ml of toluene was added to prepare a catalyst solution containing 0.5M tungsten in terms of the metal content. The solution was purged with nitrogen overnight to remove hydrogen chloride gas formed by the reaction of tungsten hexachloride with nonylphenol. The resulting solution was used as a catalyst solution for polymerization.

With 10 ml of the above catalyst solution were mixed 1.0 ml of acetylacetone and 500 ml of DCP or a DCP/BNI mixture to prepare the first reactive solution (Solution A) containing 0.001M tungsten in terms of the metal content.

PREPARATION OF SOLUTIONS CONTAINING ACTIVATOR 0.18 g Of diethylaluminum chloride and 500 ml of DCP or a DCP/BNI mixture were mixed to prepare the second reactive solution (Solution B) containing 0.003M aluminum in terms of the metal content. The contents of DCP and BNI in Solutions A and B were to the following:

|  | Comparative Example 1 | Example 1 | Example 2 | Example 3 |
|---|---|---|---|---|
| DCP (mol %) | 100 | 99.9 | 90 | 80 |
| BNI (mol %) | 0 | 0.1 | 10 | 20 |

Each of 10 ml of Solution A and 10 ml of Solution B was introduced into two syringes respectively after being kept at a given temperature shown in Table 1 below and thoroughly purged with nitrogen. The solutions in each syringe were rapidly introduced into a glass-flask equipped with a stirrer and were mixed rapidly. Then, the stirrer was removed and a thermo-couple was inserted. There was measured the time at which the reaction mixture reached at 100° C. after the introduction from the syringes (called "polymerization time" hereinafter).

In addition, the softening point which is an indication of the heat resistance of the polymer was measured by the TMA method as well as the degree of swelling in toluene which is an indication of the chemical resistance of the polymer. Results are shown in Table 1 below.

TABLE 1

| Example No. | | Comparative Example 1 | Example 1 | Example 2 | Example 3 |
|---|---|---|---|---|---|
| Initial temp. when mixed (°C.) | | 30 | 35 | 50 | 90 |
| Polymerization time reaching 100° C. (sec.) | | 25 | 29 | 49 | 12 |
| TMA softening point (°C.) | first* | 93 | 94 | 100 | 65 |
| | second** | 113 | 115 | 172 | 69 |
| Degree of swelling*** | | 1.52 | 1.55 | 1.45 | 1.70 |
| Notched Izod impact strength | | 4.2 | — | 46 | 52 |

TABLE 1-continued

| Example No. | Comparative Example 1 | Example 1 | Example 2 | Example 3 |
|---|---|---|---|---|
| (kg cm/cm) | | | | |

*Measured by the needle penetration mode with heating the sample at the temperature increase of 10° C./min. under N₂ gas.
**Measured after the sample was heated up to 280° C. by the needle penetration mode with heating the sample at the temperature increase of 10° C./min. under N₂ gas.
***Samples were immersed in toluene for one day. Then, the weight ratio of the swelled samples to the originals was measured.

Table 1 shows that the increase of BNI necessitates a higher initial temperature to obtain the similar range of polymerization time. This shows that BNI can moderate the metathesis polymerization very effectively.

The polymers of Examples 1 and 2, especially Example 2, have more improved heat resistance, i.e. higher softening points than that of Comparative Example 1 wherein no BNI was used. In addition, the polymer of Example 2 has lower degree of swelling, i.e. higher solvent resistance and indicates well-balanced heat resistance, chemical resistance, impact strength and fabricability.

The polymer of Example 3 has a lower softening point and a higher degree of swelling, and thus is more flexible. It is assumed that BNI used in a large amount moderates the polymerization so highly that the second cyclopentene ring of DCP less participates in the metathesis polymerization and the polymer produced is less crosslinked.

These results mean that BNI, when used in a proper amount, can effectively moderate the metathesis polymerization and also can improve thermal and chemical stabilities of the polymers.

In connection with Examples 1 and 2, each of 10 ml of Solution A and 10 ml of Solution B was introduced into two syringes respectively kept at 25° C. and thoroughly purged with nitrogen. The solutions in each syringe were injected at a constant rate into a mold of a miniature-sized RIM instrument in which nozzle the solutions were mixed. Very strong brown molded plates consisting of the polymers were produced. This shows that the compositions of Examples 1 and 2 could effectively moderate the polymerization reaction in RIM process.

In connection with Example 2 and Example 3, each of 5 ml of Solution A and 5 ml of Solution B was mixed under purging of nitrogen to prepare a pre-mixture. Then the pre-mixtures were poured into a mold kept at 25° C. Very strong brown molded plates were also prepared. The notched Izod impact strength of these plates was measured and is described in Table 1 above. As shown in Table 1, these plates prepared from the compositions of Examples 2 and 3 have more improved impact strength than that of Comparative Example 1. This shows that the compositions of Examples 2 and 3 could effectively moderate the polymerization reaction in pre-mix process.

The infrared absorption spectrum of the polymer of Example 2 is shown in the attached drawing.

EXAMPLES 4-5 AND COMPARATIVE EXAMPLES 2-3

Commercially available 2-ethylhexylamine was reacted with nadic acid anhydride in acetonitrile-toluene under reflux to prepare N-(2-ethylhexyl)nadicimide (EHNI). The reaction product was purified by distillation under a reduced pressure. The purity of the distillate measured by GC was not less than 99%.

Reactive Solutions A and B were prepared according to the similar procedures to Examples 1-3. The contents of DCP and EHNI in Solutions A and b were as follows:

| | Example 4 | Example 5 |
|---|---|---|
| DCP (mol %) | 90 | 80 |
| EHNI (mol %) | 10 | 20 |

Polymerization time, softening point and degree of swelling of the polymers produced were measured in the same manners as Examples 1-3. The results are shown in Table 2.

Plates were produced from the compositions of Examples 4 and 5 by the same premix process as Examples 2 and 3. The notched Izod impact strength of the plates was measured. The results are also shown in Table 2 below.

TABLE 2

| Example No. | | Example 4 | Example 5 | Comparative Example 1 |
|---|---|---|---|---|
| Initial temp. when mixed (°C.) | | 50 | 90 | 30 |
| Polymerization time reaching 100° C. (sec) | | 59 | 105 | 25 |
| TMA softening point (°C.) | first | 78 | 57 | 93 |
| Degree of swelling | | 1.62 | 2.05 | 1.52 |
| Notched Izod impact strength (kg cm/cm) | | 48 | 52 | 4.2 |

Table 2 shows that EHNI can effectively moderate the metathesis polymerization and can also provide the improved impact strength of the molded article, although the softening temperatures were slightly reduced.

EXAMPLES 6-7

N-phenyl nadic imide (called "PNI" hereinafter) was prepared from nadic acid anhydride and aniline. PNI was purified by recrystallization to a purity of not less than 99% as measured by GC. Melting point of purified PNI was 139°-142° C.

PNI was less soluble in DCP. There was used 5-cyanonorbornene (CN) with DCP to increase the solubility of PNI. Thus, the following monomer mixtures containing PNI were used to prepare reactive Solutions A and B according to the similar procedures to Examples 1-3.

CN was prepared by the reaction of cyclopentadiene with acrylonitrile and purified by distillation.

|  | Example 6 | Example 7 |
|---|---|---|
| DCP (mol %) | 77 | 52 |
| CN (mol %) | 20 | 38 |
| PNI (mol %) | 3 | 10 |

Polymerization time, softening point and degree of swelling were measured in the same manner as Examples 1-3. The results are shown in Table 3.

TABLE 3

|  |  | Example 6 | Example 7 |
|---|---|---|---|
| Initial temp. when mixed (°C.) |  | 35 | 60 |
| Polymerization time reaching 100° C. (sec.) |  | 389 | 42 |
| TMA softening point (°C.) | first | 91 | 83 |
| Degree of swelling |  | 2.18 | 2.93 |

Table 3 shows that PNI can effectively moderate the metathesis polymerization with CN.

EXAMPLE 8

N,N'-trimetylhexamethylene-bis-nadic imide (TMHNI) was prepared by reacting commercially available mixture of 2,2,4-trimethylhexamethylene diamine and 2,4,4-trimethylhexamethylene diamine with nadic acid anhydride. Melting point of TMHNI purified by recrystallization was 109°-115° C. TMHNI was less soluble in DCP (up to 5 wt. % at a room temperature).

According to the similar procedures to Examples 1-3, there were prepared reactive Solutions A and B, each of them containing 98 wt. % of DCP and 2 wt. % of TMHNI. Polymerization time, softening point (TMA) and degree of swelling were measured in the same manner as Examples 1-3. The results are shown in Table 4 below.

TABLE 4

| Initial temp when mixed (°C.) |  | 32 |
|---|---|---|
| Polymerization time (sec.) |  | 62 |
| Softening point (TMA) (°C.) | first | 104 |
| Degree of swelling |  | 1.56 |

Table 4 shows that TMHNI having two norbornene groups can provide the improved heat resistance and can effectively moderate the polymerization reaction.

EXAMPLE 9

There was prepared N,N'-hexamethylene-bis-nadic imide (HNI) by reacting commercially available hexamethylene diamine with nadic acid anhydride. Melting point of HNI purified by recrystallization was 134°-137° C. HNI was less soluble in DCP (up to 5 wt. %)

According to the similar procedures to Examples 1-3, there were prepared reactive Solutions A and B, each of them containing 95 wt. % of DCP and 5 wt. % of HNI.

Polymerization time, softening point (TMA) and degree of swelling were measured in the same manner as Examples 1-3. The results are shown in Table 5 below.

TABLE 5

| Initial temp. when mixed (°C.) |  | 32 |
|---|---|---|
| Polymerization time (sec.) |  | 73 |
| Softening point (°C.) | first | 119 |
| Degree of swelling |  | 1.68 |

Table 5 shows that HNI having two norbornene groups could provide the improved heat resistance together with the moderating of the polymerization.

EXAMPLES 10-29

The following norbornene-structure containing monomers were prepared from commercially available raw materials, and purified by distillation to such an extent as be used in metathesis polymerization.

(i) nobornene (NB), commercially available (ii) cyclopentadiene-methylcyclopentadiene-codimer (MDCP) prepared from methyl cyclopentadiene and cyclopentadiene (CPD)

(iii) 5-ethylidene-norbornene (ENB), commercially available (iv) 5-vinyl-norbornene (VNB), commercially available (v) 5-methyl-norbornene (MNB) prepared from CPD and propylene (vi) 5-phenylnorbornene (PNB) prepared from CPD and styrene (vii) 1,4,5,8-dimethano-1,4,4a,5,8,8a-hexahydronaphthalene (DMHN) prepared from CPD and norbornadiene (viii) 6-ethylidene-1,4,5,8-dimethano-1,4,4a,5,7,8,8a-hexahydronaphthalene (E-DMN) prepared from CPD and ENB (ix) tri-cyclo[8,2,1,0]trideca-5,11-diene (TTD) prepared from 1,5-cyclooctadiene and CPD (x) 1,4,5,8-dimethano-1,4,4a,5,6,7,8,8a-octahydronaphthalene (DMN) prepared from NB and CPD (xi) 6-methyl-1,4,5,8-dimethano-1,4,4a,5,6,7,8,8a-octahydronaphthalene (M-DMON) prepared from CPD and MNB (xii) tricyclopentadiene (CPT) prepared from DCP (xiii) 5,6-dicyanonorbornene (DCNB) prepared from CPD and fumaronitrile (xiv) 6-cyano-1,4,5,8-dimethano-1,4,4a,5,6,7,8,8a-octahydronaphthalene (C-DMON) prepared from CN and CPD (xv) 5-methoxycarbonylnorbornene (MCNB) prepared from methylacrylate and CPD (xvi) 5-methyl-5-methoxycarbonylnorbornene (MMCNB) prepared from methyl methacrylate and CPD (xvii) 5-phenoxymethylnorbornene (PMNB) prepared from allylphenylether and CPD (xviii) 5-methyl-5-butoxycarbonylnorbornene (MBCNB) prepared from butyl methacrylate and CPD (xix) nadic acid dimethyl (NDM) ester prepared from dimethyl maleate and CPD (xx) 5-(4-pyridyl)norbornene (PYNB) prepared from 4-vinylpyridine and CPD According to similar procedures to Examples 1-3, there were prepared reactive Solutions A and B, each of them having the monomer compositions shown in Table 6.

Polymerization times and softening points were measured in the same manner as Examples 1-3. The results are also shown in Table 6. In all cases, BNI acted as a very effective polymerizable moderator.

TABLE 6

| Examples No. | 10 | 11 | 12 | 13 | 14 | 15 | 16 | 17 | 18 | 19 | 20 | 21 |
|---|---|---|---|---|---|---|---|---|---|---|---|---|
| Monomer | | | | | | | | | | | | |
| DCP mol % | 80 | 85 | 70 | 85 | 85 | 85 | 80 | 80 | 85 | 60 | 85 | 80 |
| BNI mol % | 10 | 10 | 10 | 10 | 10 | 10 | 10 | 10 | 10 | 10 | 10 | 10 |
| Other monomer | NB | MDCP | ENB | VNB | MNB | PNB | DMHN | E-DMN | TTD | DMON | M-DMON | CPT |
| (mol %) | (10) | (5) | (20) | (5) | (5) | (5) | (10) | (10) | (5) | (30) | (5) | (10) |
| Initial temp. when mixed (°C.) | 50 | 50 | 50 | 50 | 50 | 50 | 50 | 50 | 50 | 50 | 50 | 50 |
| Polymerization time (sec.) | 42 | 50 | 47 | 49 | 43 | 45 | 46 | 45 | 46 | 65 | 51 | 44 |
| TMA softening point (°C.) first | 94 | 95 | 95 | 93 | 94 | 99 | 130 | 125 | 105 | 143 | 110 | 130 |

| Examples No. | 22 | 23 | 24 | 25 | 26 | 27 | 28 | 29 |
|---|---|---|---|---|---|---|---|---|
| Monomer | | | | | | | | |
| DCP mol % | 90 | 90 | 80 | 85 | 85 | 85 | 85 | 85 |
| BNI mol % | 5 | 5 | 10 | 5 | 5 | 5 | 5 | 10 |
| Other monomer | DCNB | C-DMON | MCNB | MMCNB | MBCNB | PMNB | NDM | PYNB |
| (mol %) | (5) | (5) | (10) | (5) | (5) | (5) | (5) | (1) |
| Initial temp. when mixed (°C.) | 35 | 35 | 50 | 35 | 35 | 35 | 35 | 50 |
| Polymerization time (sec.) | 301 | 250 | 55 | 150 | 160 | 155 | 170 | 85 |
| TMA softening point (°C.) first | 88 | 105 | 85 | 87 | 75 | 78 | 82 | 98 |

We claim:

1. A process for producing a crosslinked molded article by introducing a reactive liquid mixture which mixture comprises metathesis polymerizable monomers and a metathesis polymerization catalyst system into a mold in which said liquid mixture is metathesis polymerized in bulk to produce the molded article, said process being characterized in that the metathesis polymerizable monomers comprise
    (a) 99.9-80 mol % of a metathesis polymerizable cycloalkene comprised of dicyclopentadiene and up to 70 mol % of at least one other metathesis polymerizable cycloaklene and
    (b) 0.1 to 20 mole % of an imide group containing norbornene-type monomer of the general formula

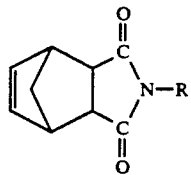

where R is an alkyl radical of 3 to 9 carbon atoms and the metathesis polymerization catalyst system comprises, as the catalyst component, a tungsten or molybdenum salt and, as the activator component, an alkyl aluminum compound.

2. The process of claim 1 wherein said reactive liquid mixture is prepared by mixing at least a first solution containing a metathesis polymerization catalyst and at least one metathesis polymerizable cycloalkene and a second solution containing an activator for the metathesis polymerization catalyst and at least one metathesis polymerizable cycloalkene and at least one of said solutions contains the imide group-containing norbornene-type monomer.

3. The process of claim 2 wherein each of the first and second reactive solutions contain both the metathesis polymerizable cycloalkene and the imide group-containing norbornene-type monomer.

4. The process of claim 3 wherein the metathesis polymerizable cycloalkene other than dicyclopentadiene is a hydrocarbon containing at least one norbornene group and is selected from the class consisting of norbornene, 5-methylnorbornene, 5-ethylnorbornene, 5-butylnorbornene, 5-vinylnorbornene, 5-ethylidenenorbornene, 5-isopropenylnorbornene, 5-isopropylideneorbornene, cyclopentadiene-methylcyclopentadiene-codimer, 5-phenyl-norbornene, 1,4,5,8-dimethano-1,4,4a5,8,8a -hexahydronaphthalene, 6-ethylidene-1,4,5,8-dimethano-1,4,4a5,7,8,8a -heptahydronaphthalene, tri-cyclo[8,2,1,0]trideca-5,11-diene, 1,4,5,8-dimethano-1,4,4a,5,6,7,8,8a-octahydronaphthalene, 6-methyl-1,4,5,8-dimethano-1,4,4a,5,6,7,8,8a -octahydronaphthalene and tricyclopentadiene.

5. The process of claim 4 wherein the reactive liquid mixture is injected into the mold immediately after mixing.

6. The process of claim 3 wherein the catalyst component of the metathesis polymerization catalyst system is a tungsten halide and the activator is an alkyl aluminum halide.

7. The process of claim 6 wherein the tungsten halide is a chloride and the activator is analkyl aluminum chloride.

8. The process of claim 7 wherein the imide-containing norbornene monomer is selected from the group consisting of N-butyl nadic imide and N-2-ethylhexyl nadic imide.

* * * * *

UNITED STATES PATENT AND TRADEMARK OFFICE
CERTIFICATE OF CORRECTION

PATENT NO. : 5,064,919

DATED : November 12, 1991

INVENTOR(S) : Shigeyoshi Hara, Zen-ichiro Endo and Hiroshi Mera

It is certified that error appears in the above-identified patent and that said Letters Patent is hereby corrected as shown below:

Col. 6, line 30, after "are" insert --used 99.9-70 mol % of metathesis polymerizable cycloalkene--;

Col. 14, line 22, delete "1 15" before --(iv)--;

Col. 16, Table 6, Example No. 29 opposite "DCP mol %" "85" should read --89--;

In the Claims, Col. 16, line 41, "-1,4,4a5,7,8,8a-" should read -- -1,4,4a,5,7,8,8a- --.

Signed and Sealed this

Fourth Day of May, 1993

Attest:

MICHAEL K. KIRK

Attesting Officer

Acting Commissioner of Patents and Trademarks